April 13, 1965 L. C. RENFROE 3,177,522
APPARATUS FOR EVISCERATING SCALLOPS
Filed March 20, 1961 6 Sheets-Sheet 1

INVENTOR
Lester C. Renfroe
BY Irons, Birch, Swindler & McKie
ATTORNEYS

April 13, 1965  L. C. RENFROE  3,177,522
APPARATUS FOR EVISCERATING SCALLOPS
Filed March 20, 1961  6 Sheets-Sheet 3

INVENTOR
Lester C. Renfroe
BY Irons, Birch, Swindler & McKie
ATTORNEYS 3,177,522
APPARATUS FOR EVISCERATING SCALLOPS
Lester C. Renfroe, 5514 Floral Bluff Road,
Jacksonville, Fla.
Filed Mar. 20, 1961, Ser. No. 96,991
17 Claims. (Cl. 17—2)

This invention relates to the preparation of scallops for consumption and more particularly to an apparatus for serving the inedible viscera from the edible muscle portion of scallops.

The preparation of scallops for packaging for mass distribution and human consumption is attended by difficulties arising from the circumstance that only the firm muscle portion of the scallop is considered edible and the undesirable viscera clings tenaciously to the muscle periphery and is difficult to remove. Heretofore, evisceration of scallop muscles generally has been accomplished by hand. No mechanical eviscerator which satisfactorily severs the viscera from the muscle without damaging the muscle itself has heretofore been available to the art.

The problem is particularly acute with respect to the calico scallop which is available in large quantities in such locations as the waters off the Atlantic coast of Florida. The calico scallop is very small and evisceration by hand is so time consuming in relation to yield as to render it economically impractical. Consequently, despite the ready availability of calico scallops, there has been no significant commercial exploitation of them.

To overcome the disadvantages of the prior art it is a primary object of the present invention to provide a highly efficient mechanical scallop eviscertating apparatus.

Another object of the invention is to provide a scallop eviscerating apparatus which completely and cleanly severs the viscera from the edible muscle portion without damaging the scallop muscle.

Still another object of the invention is to provide such an apparatus which is economical in construction and use and is characterized by high capacity and ease of operation and maintenance.

A further object of the invention is to provide such an apparatus which provides separate outlets for the viscera and cleaned muscles.

In general, the invention entails an apparatus for eviscerating scallops which comprises means to sever the viscera from the periphery of a scallop muscle without damaging the muscle itself and means to move the entire viscera bearing periphery of the muscle into viscera severing relationship with the severing means. Preferably the severing is performed by a pair of cutting elements relatively movable in cooperative shearing relationship. All of the working mechanisms can be power operated to achieve maximum automation. In a preferred form of the apparatus a knife is moved across the face of a perforated wall in conformity therewith to effect the shearing action between the knife and the edges of the perforations. The perforations are too small to permit passage of the muscles but the viscera moves freely through the perforations to be discharged. Preferably, suction is applied to the opposite side of the perforated wall to facilitate severance and removal of the viscera.

The invention also generally encompasses an apparatus for eviscerating scallops which comprises means for feeding a generally cylindrical viscera bearing scallop muscle in an axial direction, continuously and cleanly severing the viscera from a longitudinal portion of the muscle periphery without damaging the muscle while rotating the muscle about its axis until all of the viscera is removed.

The invention having been generally described, various specific embodiments thereof will now be set forth in detail with reference to the accompanying drawings in which.

Figure 1:
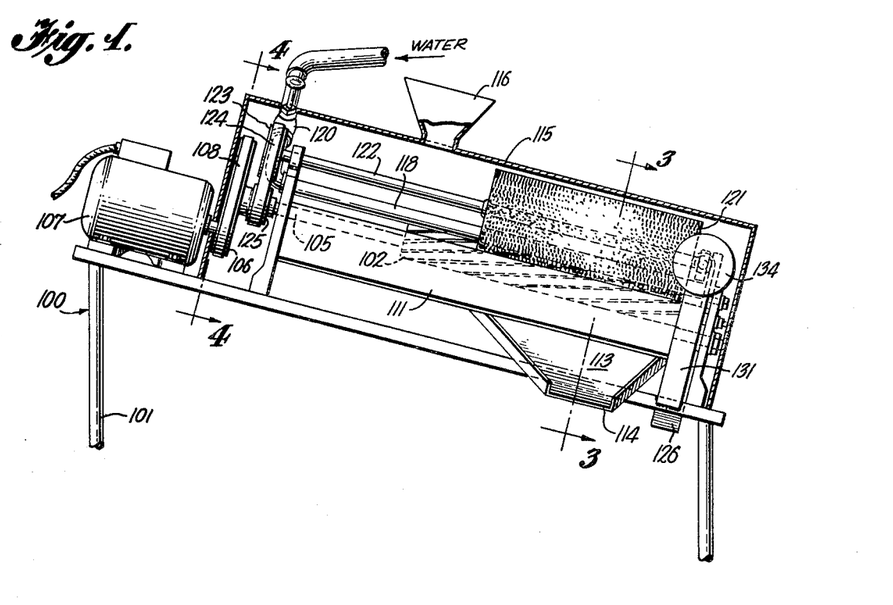
FIGURE 1 is an elevational view partly in section illustrating one form of the apparatus of the invention.

Depicted in FIGURE 1 is one form of scallop eviscerator according to the invention identified generally by the reference numeral 100. It includes a supporting frame 101 which is illustrated and described only to a limited extent as necessary to an understanding of its function in relation to the apparatus of the invention. Connected to the frame 101 is a cutting roller 102 which is cylindrical in configuration and has on its outer periphery a plurality of protruding helical blades 103 which have sharp cutting edges. Recesses 104 between the blades 103 are defined by the body of the roller 102 and the protruding blades. The roller 102 is mounted on a shaft 105 which is journaled in suitable bearings in the frame 101 and is fixed to a pulley 106 which is rotated by an electric motor 107 through a belt 108. It will be understood that any suitable power means other than an electric motor may be employed.

A shearing bar 111 is fixed to the frame 101. One corner of the shearing bar 111 comprises an edge 112, which is preferably a sharp knife edge, and which extends parallel to the roller 102 in engagement with the knife edges of helical blades 103. Thus, when the roller 102 is rotated the blades 103 in moving relative to the edge 112 effect a shearing action therewith.

Figure 3:
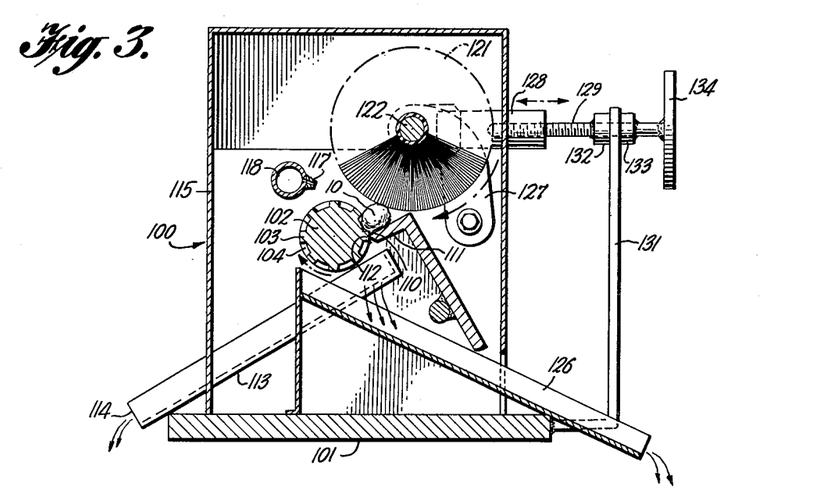
FIGURE 3 is a section taken along the line 3—3 of FIGURE 1 to an enlarged scale.
Figure 4:
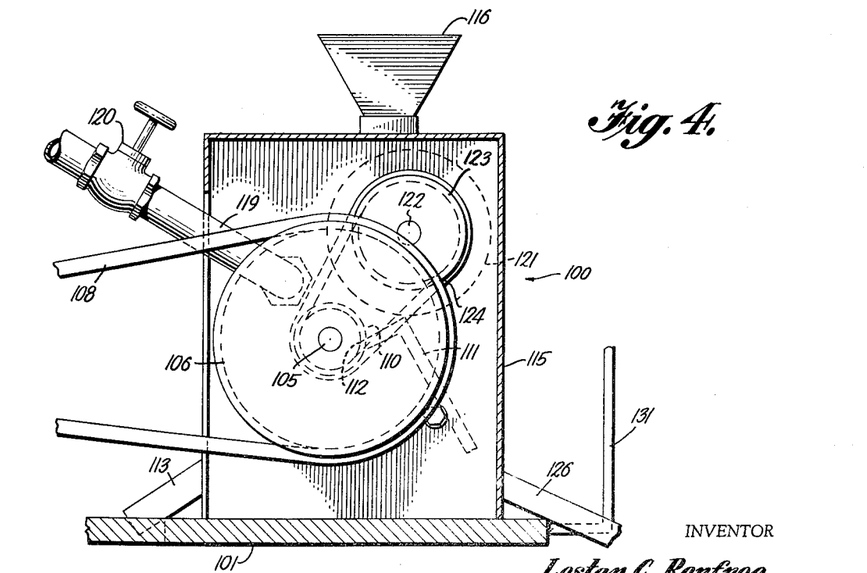
FIGURE 4 is an end view of the apparatus of FIGURE 1 to an enlarged scale.

With reference to FIGURE 3, the upper portions of the roller 102 and the shear bar 111 define a V-shaped channel 110 to receive viscera bearing scallop muscles 10. The muscles are generally cylindrical and when dropped in the channel 110, they orient themselves in axial alignment parallel to the axis of the roller 102. When the roller 102 is rotated (in a clockwise direction as shown in FIGURE 3) to move the knives 103 toward and into shearing relationship with the edge 112, the soft and slipper viscera is pushed between the blade 103 and the edge 112 into the recesses 104 and is severed by the shearing action. Since the recesses 104 are to small to pass the muscles 10 between the cutting edges, the muscles remain in the channel 110 while the viscera is being sheared off. The severed viscera is in comminuted form and is deposited in a tray 113 which is situated directly below the channel 110 and is inclined to discharge the viscera outside of the apparatus from an open end 114 of the tray.

Figure 2:
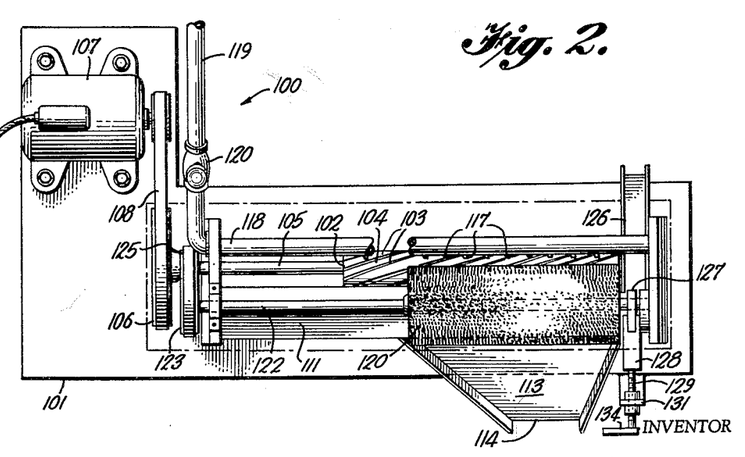
FIGURE 2 is a plan view of the apparatus shown in FIGURE 1 with some parts broken away and some parts omitted.

A housing 115 surrounds the upper portion of the apparatus. A hopper 116 is mounted on top of the housing with an opening extending through the housing to deposit viscera bearing scallop muscles into one end of the channel 110. Muscles preferably are dropped by the hopper 116 at spaced time intervals to leave a plurality of muscles axially aligned in the channel 110 to be simultaneously eviscerated. As described, the roller 102 is rotated to effect shearing action between the blades 103 and the edge 112 to sever the viscera. During the severing operation, each muscle moves along the channel 110 away from the inlet hopper 116. Such movement is imparted to the muscles by several contributing forces. First, as shown in FIGURE 1, the roller 102 and shear bar 111 are longitudinally inclined relative to the horizontal. Secondly, the inclination of the blade 103 relative to the edge 112 tends to move the muscles longitudinally. Further a stream of water is directed from a plurality of nozzles 117 located on the under side of a pipe 118 to which water is supplied by a conduit 119 from any suitable source, not shown. The flow of water is controlled by a valve 120 in the conduit 119. As illustrated in FIGURE 2, nozzles 117 are pointed in the direction of desired movement of the muscles to deliver the water stream in that direction. If desired, nozzles may be situated at spaced intervals throughout the length of the cutting roller 102, as shown in FIGURE 2. Alternatively, a single nozzle may be employed at the entrance end of the channel 110 near the feed point of the hopper 116. The stream of water not only imparts movement to the scallop muscles but also lubricates the cutting edges and cleans the muscles of severed viscera and foreign matter.

As the muscles move longitudinally in the channel 110 they are also caused to rotate or tumble about their axes to bring all portions of their viscera bearing periphery into viscera severing relationship with the cutting edges. The rotation of the roller 102 tends to cause the muscles thus to tumble. Such tumbling action is further facilitated by a rotary brush 121 which is mounted parallel to the axis of the roller 102 to extend into the channel 110 a sufficient distance to contact the upper portions of the muscles 10 in the channel. The brush 121 is mounted on a shaft 122 which is rotatably mounted on the frame 101 and is rotated (in a clockwise direction as viewed in FIGURE 3) by a pulley 123 which is driven by a belt 124 which in turn is driven by a pulley 125 integral and coaxial with the pulley 106. The rotating brush 121 not only facilitates tumbling of the muscles but also helps to retain the muscles in the channel. The rotating brush is not essential, however, to the operation of the device.

The brush 121 may be adjustably connected to the frame 101 as will now be described. One end of the brush shaft 122 is journaled in one end of a bell crank 127 the other end of which is pivotally connected to the frame 101. Attached to the same end of the bell crank 127 as the shaft 122 is an adjustable link 128. One portion of the link 128 is threadedly bored to receive a screw 129 which is rotatably mounted in bracket 131 welded to the frame 101. The screw 129 is fixed against longitudinal movement relative to the bracket by a pair of shoulders 132 and 133 attached to the screw on opposite sides of the bracket. The screw may be rotated by a handle 134 on its outer end to pivot the bell crank 127 in either direction thereby to bring the brush 121 further into or away from the channel.

As the muscles move axially along the channel 110 they are progressively cleaned of viscera and upon reaching the opposite end of the channel they are essentially viscera-free. At the end of the channel 110 the muscles drop into an inclined outlet chute 126 which is situated below the end of the channel and extends outside of the housing 115 to discharge the cleaned muscles.

Figure 5:
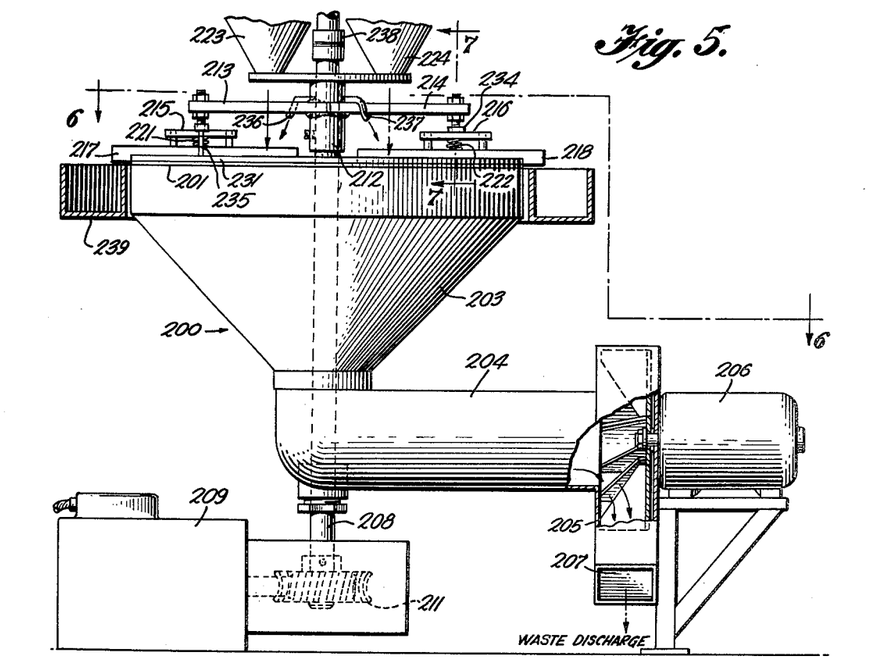
FIGURE 5 is an elevational view partially in section of another form of apparatus according to the invention.
Figure 6:
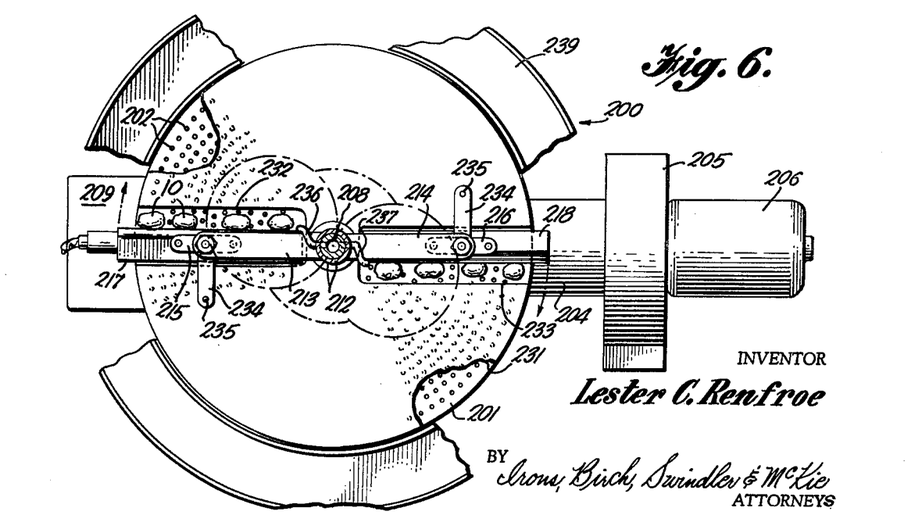
FIGURE 6 is a horizontal sectional view taken along the line 6—6 of FIGURE 5.
Figure 7:
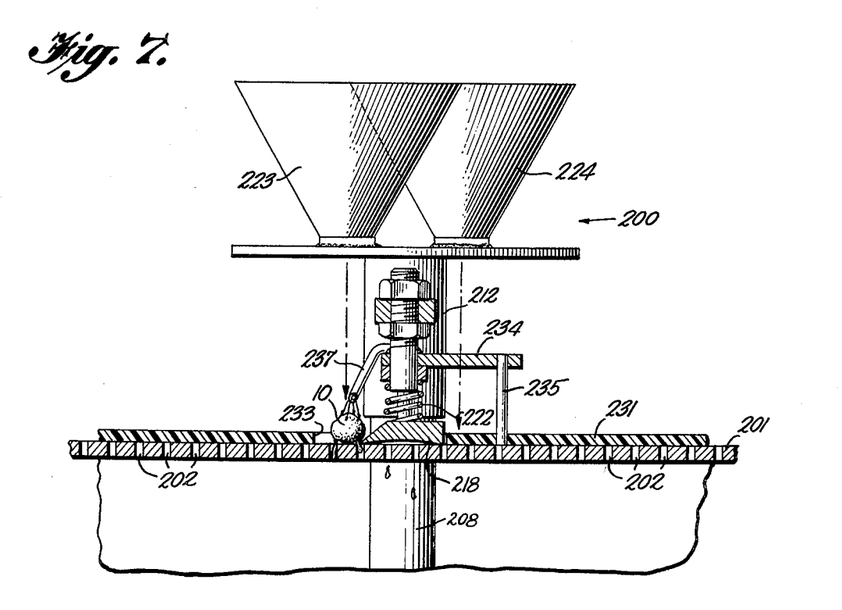
FIGURE 7 is an enlarged vertical section taken along the line 7—7 of FIGURE 5.

Illustrated in FIGURES 5–7 is another form of the apparatus of the invention which is identified by the reference numeral 200. This modification includes a flat plate 201 which contains a plurality of perforations 202 extending through the plate. Preferably the plate 201 is circular and horizontal. The upper edges of the perforations 202 are preferably fairly sharp. The plate 201 is supported by a frustoconical housing 203 which together with the plate 201 defines a chamber below the plate connected to a conduit 204 which in turn is connected to a centrifugal suction pump 205 driven by a motor 206, which may be an electric motor. The pump outlet is shown at 207.

Extending vertically through the housing 203 is a rotatable shaft 208 which may be rotatably driven by a motor 209 through suitable gearing 211. The shaft 208 protrudes upwardly through the plate 201 and fixed to the protruding top of the shaft is a collar 212 which rotates with the shaft. Extending outwardly from the collar 212 are a pair of arms 213 and 214. Connected in depending relation from the opposite ends of the arms 213 and 214 are brackets 215 and 216. A pair of knives 217 and 218 are connected to the under side of the brackets 215 and 216 respectively by pins which are fixed to the knives and extend upwardly through the brackets in slidable relation therewith to permit the knives 217 and 218 to move upwardly or downwardly. A pair of compression springs 221 and 222 act against the brackets 215 and 216 and bias the knives 217 and 218 respectively downwardly into engagement with the upper face of the plate 201, as shown in FIGURE 7. When the shaft 208 rotates the knives 217 and 218 are carried over the face of the plate 201. The leading edge of each of the knives 217 and 218 is sharpened, as shown in FIGURE 7. Preferably the under side of each of the knives 217 and 218 is recessed, as also shown in FIGURE 7.

A pair of scallop feeding hoppers 223 and 224 are affixed to the collar 212 for rotation therewith. The hoppers are situated directly above points located near the inner end of the knives 217 and 218 respectively and slightly forward of the leading cutting edge of such knives. Accordingly, viscera bearing scallop muscles are deposited by the hoppers slightly forward of the inner leading edge of each knife as illustrated in FIGURE 7. The generally cylindrical muscles 10 orient themselves parallel to the moving knives. Suction applied by the pump 205 through the perforations 202 draws the viscera into the openings 202 as shown in FIGURE 7. Thus, the viscera is severed from the muscle as the knives move across the perforations to effect a shearing action with the edges of the perforations. To insure maximum effectiveness of the suction most of the perforations in the plate 201 have their upper ends sealed by a circular plate 231 which preferably is transparent and is situated above and contacting the plate 201. The plate 231 has a pair of slots 232 and 233 to accommodate the knives 217 and 218 and narrow areas immediately ahead of the leading edges of the knives to expose the tops of the openings 202 in such areas where the scallops are being eviscerated. The plate 231 is fixed to the collar 212 by a pair of arms 234 and pins 235 which cause the plate 231 to rotate with the knives.

When the scallops are deposited by the hoppers 223 and 224 ahead of the inner ends of the knives 217 and 218, the viscera severing operation begins. As the knives move around the plate 201, the scallop muscles rotate or tumble ahead of the knives to bring all portions of the viscera bearing periphery of the muscles into operative viscera severing relation with the cutting elements so that the periphery eventually is completely cleaned of viscera.

Several forces contribute to such tumbling action. First, the knives tend to push the muscles ahead of them and due to the cylindrical shape of the muscles they tend to rotate. Further, as shown in FIGURE 7, the perforations 202 are spaced apart a distance no greater than the width of the viscera bearing muscle so that the viscera on a given muscle is drawn into at least two circumferentially spaced perforations simultaneously. As the knife moves against the muscle it severs the viscera in the nearest perforation or perforations to release the trailing end of the muscle. The forward end of the muscle, however, is still held against the plate 201 by its viscera which is drawn into perforations somewhat ahead of the knife. The release of the trailing end and retention of the forward end of the muscle permits it to rotate forwardly so that new viscera is drawn into perforations still further ahead of the knife before the then trailing viscera is severed. Thus it can be seen that the muscles are retained against the plate 201 and are rotated ahead of the cutting blades to bring all portions of the muscle peripheries into viscera severing relationship with the blades.

Moreover, as the viscera is severed from the muscles, the latter are caused to move radially outwardly along the leading edge of the knives. Two primary factors contribute to such radially outward migration of the muscles. First, streams of water are directed outwardly along the leading edges of the knives in the slots 232 and 233 to impart an outward force to the muscles and also to clean them of severed viscera and foreign matter as well as to lubricate the cutting surfaces. The water streams are emitted by nozzles 236 and 237 which are mounted at the inner ends of the knives to direct the streams outwardly in front of the leading edges of the knives. The nozzles are fixed to the collar 212 for rotation with the knives and communicate with a source of water, not shown, through a swivel fitting 238.

Further, the knife edges and perforations are oriented to effect an outward movement of the muscles. As shown in FIGURE 6, the perforations are arranged in lines which are forwardly inclined with respect to the leading edge of the blades. The lines of perforations are inclined forwardly of a radial direction whereas the knives are situated radially. If desired, the perforation lines may be radial and the knives may be inclined behind radial lines. Still further, the perforations in the outwardly extending lines are spaced a distance no greater than the length of the viscera covered muscles. Thus along any given inclined line of perforations, the viscera in a near perforation would be severed before the viscera in an outer perforation. Thus, the inner end of the scallop would be released while the outer end is still retained. This relationship between the lines of perforations and the knife edges thus imparts an outward component of movement to the muscles. Still further as muscles are deposited at the radially inner end of the knife edges, they tend to move previously deposited muscles outwardly ahead of them.

Preferably scallops are deposited in the hoppers 223 and 224 at predetermined time-spaced intervals. Such spaced feeding may be accomplshed by hand or preferably automatically by a synchronized conveyor which deposits the muscles at the desired regular intervals. The timing is such that as each muscle moves radially outwardly along the viscera severing area, a new muscle is deposited to take its place to present a substantially continuous line of muscles along the knife edges with each muscle being retained along the knife edge for a sufficient time to permit it to be completely severed of viscera.

The severed viscera is drawn through the perforations 202 into the chamber within housing 203 for discharge through the conduit 204, centrifugal suction pump 205 and discharge outlet 207. The viscera is in finely comminuted form as it is dscharged and may be used for various commercial purposes such as animal feeds, fertilizers and the like.

The muscles after being completely cleaned of viscera drop off the radially outer edges of the plate 201 into an outlet such as the annular receiver tank 239 which is positioned beneath the radially outer edge of the plate 201.

Figures 8, 9:
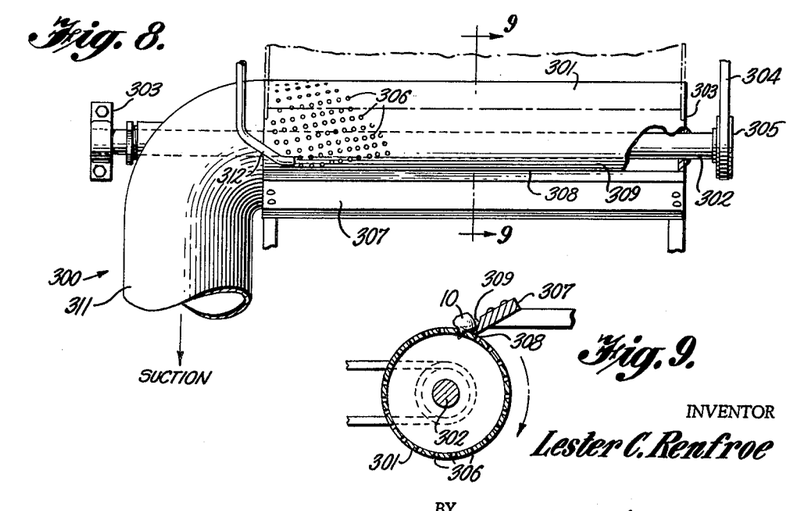
FIGURE 8 is a fragmentary plan view, partially in section, of a further modified form of apparatus according to the invention.
FIGURE 9 is a vertical section taken along the line 9—9 of FIGURE 8.

A further modified form of scallop eviscerator according to the invention is depicted in FIGURES 8 and 9. This eviscerating apparatus is identified generally by the reference numeral 300 and is similar in principle to the device 200. The eviscerator 300 comprises a rotatable hollow cylinder 301 which is fixed to a shaft 302 which is journaled in a frame 303 only a fragment of which is shown. The shaft 302 is rotated by a suitable motor, not shown, connected to the shaft by means of a belt 304 and pulley 305. The peripheral wall of the cylinder 301 contains a plurality of perforations 306 which perform the identical functions as the perforations 202 in the device 200. A knife 307 having its sharpened edge 308 parallel to the axis of the cylinder 301 and conforming to the periphery thereof engages the outer surface of the cylinder. The knife 307 and the edges of the perforations 306 achieve a shearing action to separate the viscera from scallops in an identical manner to that previously described with respect to the device 200. The cylinder 301 rotates in a clockwise direction, as shown in FIGURE 9, and the knife 307 is maintained stationary. Viscera bearing scallop muscles 10 are deposited in the channel 309 defined by the knife 307 and the surface of the cylinder 301. Suction is applied to the cylinder 301 by a suitable suction pump, not shown, connected to the cylinder by means of the conduit 311. Thus, the viscera before its severance is pulled into the perforations 306 and as the cylinder rotates the viscera is severed. As previously described, the perforations are circumferentially spaced from each other a distance of less than the width of the muscles to cause the muscles to tumble or rotate in front of the knife 307 thus bringing all portions of the viscera bearing periphery of the muscles into viscera severing relationship with the cutting elements. The scallops are deposited by any suitable means such as a hopper at one end of the channel 309 and are moved longitudinally along the channel by a stream of water directed from the nozzle 312 in the direction of the desired movement. The nozzle 312 is connected to any suitable source of water, not shown. Preferably, the perforations 306 are arranged in lines which are inclined with respect to the knife 307 as previously described to assist in the longitudinal movement of the scallops along the knife edge. At the end of the channel 309 opposite the inlet for the scallops, the cleaned muscles drop off into any suitable collecting device.

Figure 10:
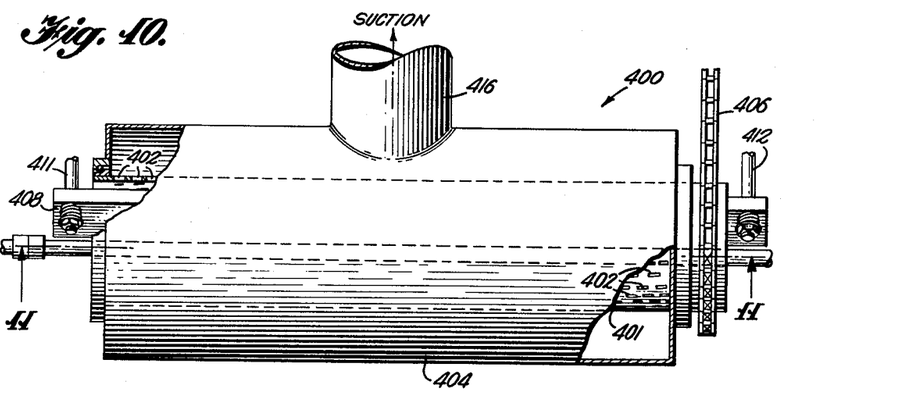
FIGURE 10 is a fragmentary plan view, partially in section, of still another modified form of the apparatus of the invention.
Figure 11:
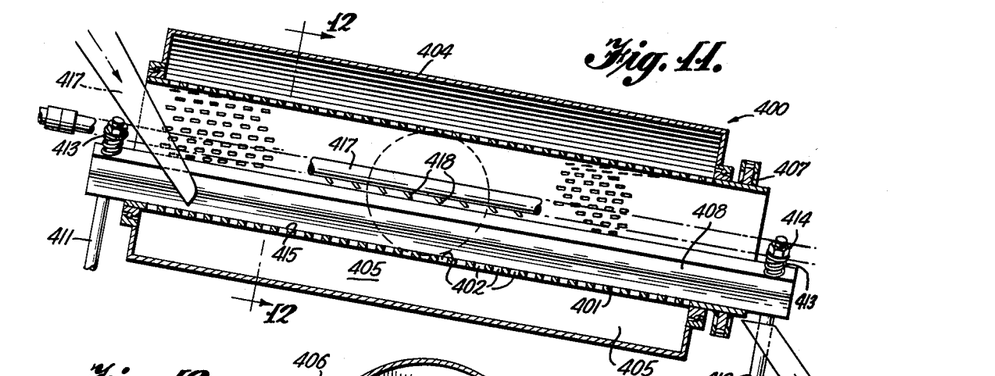
FIGURE 11 is a vertical sectional view taken along the line 11—11 of FIGURE 10.
Figure 12:
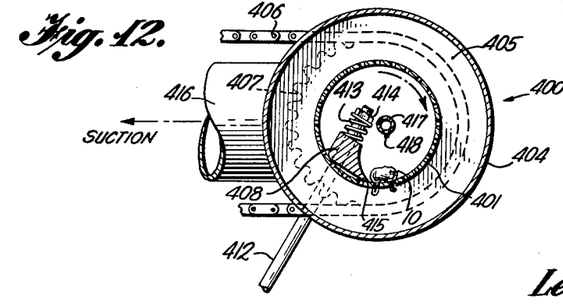
FIGURE 12 is a sectional taken along the line 12—12 of FIGURE 11.

The further modified device 400 illustrated in FIGURES 10–12 is similar to the eviscerator 300 except that the stationary knife is mounted inside of the perforated rotatable cylinder and suction is applied outside of the cylinder. Specifically, the device 400 includes a hollow cylinder 401. A plurality of perforations 402 extend through the peripheral wall of the cylinder 401. A housing 404 surrounds the perforated cylinder 401 to form a chamber 405 therebetween. The housing 404 is fixed to any suitable frame and the cylinder is journaled for rotation within the housing. Rotation is accomplished by means of any suitable motor, not shown, connected to the cylinder by the chain 406 and sprocket 407. A straight knife 408 extends longitudinally inside of the cylinder 401 and in contact with the inner wall of the cylinder throughout its length. The knife 408 is mounted on a pair of rods 411 and 412 and is biased into contact with the cylinder by a pair of compression springs 413 which are retained by nuts 414 at the ends of the rods 412. The knife 408 has a cutting edge 415 which engages the cylinder wall to effect a shearing action with the edges of the perforations 402. Suction is applied through the chamber 405 to remove the viscera by a suitable suction pump, not shown, connected to the chamber by a conduit 416. When viscera bearing scallop muscles are deposited at one end of the cylinder through a chute 417, shown in phantom, they are eviscerated by the shearing action. The muscles are caused to tumble in front of the knife 408 and to move longitudinally along the knife in the same manner and by the same means previously described. Water is directed along the knife edge from nozzles 416 in the direction of desired movement of the muscles. The nozzles communicate with a supply pipe 417.

Figure 13:
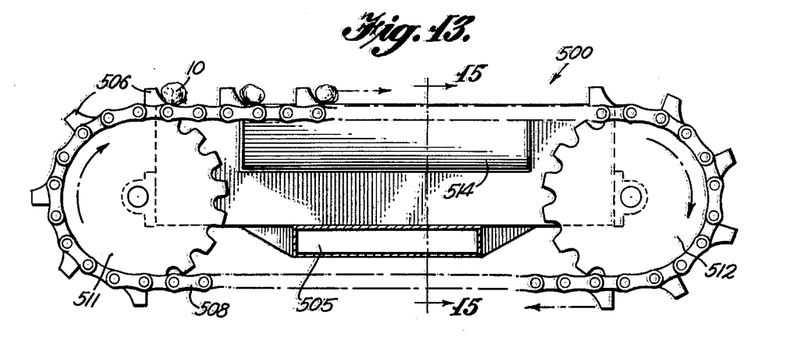
FIGURE 13 is an elevation of yet another modified form of apparatus according to the invention.
Figure 14:
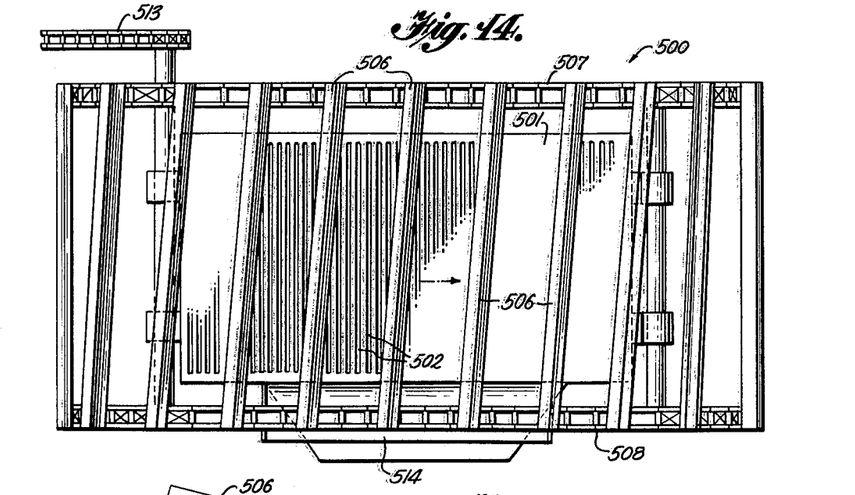
FIGURE 14 is a plan view of the apparatus of FIGURE 13.
Figure 15:
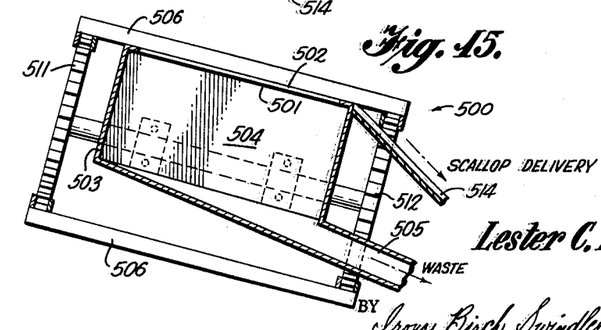
FIGURE 15 is a vertical section taken along the line 15—15 of FIGURE 13.

A further modified device 500 is depicted in FIGURES 13–15. The eviscerator 500 embodies a flat perforated plate 501 through which a plurality of elongated perforations or slots 502 extend. Below the plate 501 is a housing 503 to form a chamber 504 to which suction may be applied through the conduit 505 by any suitable suction device, not shown. The plate 501 and housing 503 are rigidly secured to any suitable frame. A plurality of knives 506 extend across the upper surface of the plate 501 in contact therewith. The leading edges of the knives 506 are sharpened. The ends of the knives are connected to pair of endless chains 507 and 508 on opposite sides of the plate 501. The chains are moved by a pair of sprockets 511 and 512, one of which is driven by a chain 513 connected to any suitable power means such as a motor. As shown in FIGURE 15 the plate 501 is inclined toward one side from the horizontal. The knives 506 are inclined slightly rearwardly toward the low side of the plate 501. When viscera bearing scallop muscles 10 are deposited near the high side of the plate 501 in front of the knives 506 the viscera is drawn through the openings 502 and is severed in the manner previously described. Similarly, by means like those previously described the muscles are caused to rotate about their own axes in front of the knives and to move transversely across the plate 501. The severed viscera is removed through the chamber 504. The muscles drop off of the low side of the plate onto an inclined tray 514 for discharge.

In all of the modifications described, scallop muscles may be quickly and completely eviscerated in a very short time. The muscles themselves are substantially undamaged by the eviscerating operation. The viscera, which emerges in finely ground form, may be salvaged for such uses as animal food and fertilizer.

The apparatus and method described is especially useful in the evisceration of calico scallops but also may be employed to eviscerate other types of scallops such as sea scallops and other forms of bay scallops.

Various specific embodiments of the invention have been illustrated and described. It will be understood that many modifications may be made by persons skilled in the art without departing from the broad scope of the invention which is defined solely by the appended claims.

I claim:

1. An apparatus for eviscerating scallops which in combination comprises supporting means having a plurality of spaced openings defining passage means to admit viscera, cooperative shearing elements associated with said openings, said cooperative shearing elements including at least one cutting element the leading edge of which is adapted to engage the viscera to sever clearly the viscera extending into said passage means, said cutting element being free of obstructions above and immediately ahead of said leading edge to permit the scallop muscle to rotate about its own axis when the viscera attached to the muscle is engaged by said leading edge.

2. An apparatus as recited in claim 1 wherein said supporting means comprises a roller and a bar in parallel contiguous relation said shearing elements including a plurality of cutting elements comprising helical blade means extending around said roller and adjoining the edge of said bar, said passage means extending between said blade means.

3. An apparatus as recited in claim 1 wherein said supporting means comprises a wall, said passage means comprise a plurality of perforations in said wall, said cutting element comprises a knife blade engaging one face of said wall and the edges of said perforations.

4. An apparatus for eviscerating scallops which in combination comprises a cylindrical roller having helical blade means disposed around the periphery of and protruding from said roller, a bar providing an edge extending longitudinally of said roller in shearing engagement with said blade means to sever the viscera from the scallop muscle upon rotation of said roller, said roller having passages between said helical blade means to admit the viscera but smaller in dimension than the scallop muscle to exclude the muscle, said roller and bar defining a channel therebetween to retain the muscles while the severed viscera passes between said roller and bar into said passages for discharge, and rotatable cylindrical means extending into said channel to rotate the muscle as the viscera is removed.

5. An apparatus as recited in claim 4 wherein said roller and bar are inclined from the horizontal.

6. An apparatus as recited in claim 4 further comprising means to direct a stream of water along said channel.

7. An apparatus as recited in claim 4 further comprising means underlying said channel to receive the severed viscera and means at one end of said channel to receive the cleaned muscle.

8. An apparatus for eviscerating scallops which in combination comprises a cylindrical roller having helical blade means disposed around the periphery of and protruding from said roller, a bar providing an edge extending longitudinally of said roller in shearing engagement with said blade means to sever viscera from a scallop muscle upon rotation of said roller, said roller having passages between said helical blade means to admit the viscera but small in dimension than the scallop muscle to exclude the muscle, said roller and bar being inclined from the horizontal and defining a channel therebetween to retain the muscle while the several viscera passes between said roller and bar into said passages for discharge, means to direct a stream of water from one end toward the other end of said channel, a rotatable cylindrical brush parallel to said roller and extending into said channel to rotate the muscle as the viscera is severed, means to deposit the viscera bearing muscle at said one end of said channel, an outlet positioned below said passages to receive the severed viscera, and an outlet at said other end of said channel to receive the cleaned muscles for discharge.

9. An apparatus for eviscerating scallops which in combination comprises means providing a perforated surface, knife means the leading edge of which conforms to and engages said surface, means to effect relative movement between said knife means and said surface to sever viscera from a scallop muscle located on said surface by shearing action against the edges of the perforations in said surface, said knife means being free of obstructions above and immediately ahead of said leading edge to permit the scallop muscle to rotate about its own axis when the viscera attached to the muscle is engaged by said leading edge, said perforations being smaller in dimension than the muscle to exclude the muscle, and suction means to remove the several viscera through said perforations.

10. An apparatus for eviscerating scallops which in combination comprises a wall containing a plurality of openings of a size to prevent passage therethrough of scallop muscles to be eviscerated, knife means having a sharpened leading edge the leading edge of which conforms to and engages one face of said wall, means to deposit viscera bearing scallop muscles on said face ahead of said leading edge, means to effect relative movement between said knife means and said one face to sever viscera from the scallop muscle by shearing action between said knife means and the edges of said openings, said knife means being free of obstructions above and immediately ahead of said leading edge to permit the scallop muscle to rotate about its own axis when the viscera attached to the muscle is engaged by said leading edge, a chamber defined at least in part by the opposite face of said wall, and means to apply suction through said chamber to draw the viscera before severance into said openings and after severance through said openings into said chamber for discharge.

11. An apparatus as recited in claim 10 wherein said wall is generally flat, said knife means is above said wall and said chamber is below said wall.

12. An apparatus as recited in claim 11 wherein said knife means and openings are oriented to move the scallop muscle along said knife means during said relative movement.

13. An apparatus as recited in claim 11 wherein said openings are generally circular.

14. An apparatus as recited in claim 11 wherein said openings are slots extending across said wall.

15. An apparatus as recited in claim 10 wherein said wall is cylindrical, said knife means is inside said cylindrical wall and said chamber is outside of said wall.

16. An apparatus as recited in claim 10 wherein said wall is cylindrical, said knife means is outside of said cylindrical wall and said chamber is inside of said wall.

17. An apparatus for eviscerating scallops which in combination comprises a generally horizontal plate containing a plurality of openings of a size to prevent passage therethrough of scallop muscles to be eviscerated, plurality of knives extending across said plate radially outwardly from a point within the area of said plate, said knives having sharpened leading edges conforming to and engaging the upper face of said plate, means to deposit viscera bearing scallop muscles on said upper face in front of each of said knives at spaced time intervals, means to effect relative rotation between said knives and said plate about said point to sever viscera from the scallop muscles by shearing action between said knives and the edges of said openings, said knives being free of obstruction above said leading edges to permit rotation of the muscles ahead of said leading edges, means to direct a stream of water radially outwardly along the leading edge of each of said knives, a housing below said plate to form a chamber communicating with the lower ends of said openings, and means to apply suction through said chamber to draw the viscera before severance into said openings and after severance through said openings into said chamber for discharge.

References Cited by the Examiner
UNITED STATES PATENTS

| | | | |
|---|---|---|---|
| 877,670 | 1/08 | Shufelt | 146—83 |
| 1,671,263 | 5/28 | Zuckerman | 146—83 |
| 1,897,664 | 2/33 | Hansen | 146—86 |
| 2,376,962 | 5/45 | Kerr | 146—86 |
| 2,455,675 | 12/48 | Hawk | 17—3 |
| 2,622,270 | 12/52 | Envoldsen | 17—45 |
| 2,784,447 | 3/57 | Thompson et al. | 17—2 |
| 2,808,615 | 10/57 | Snow | 17—45 |
| 2,934,121 | 4/60 | Schnell | 146—189 X |

SAMUEL KOREN, *Primary Examiner.*

CARL W. ROBINSON, LUCIE H. LAUDENSLAGER, *Examiners.*